April 28, 1953   GABRIEL JEUDI DIT JEUDY   2,636,255
PROCESS FOR THE PRODUCTION OF HOLLOW VALVES
Filed Jan. 22, 1951
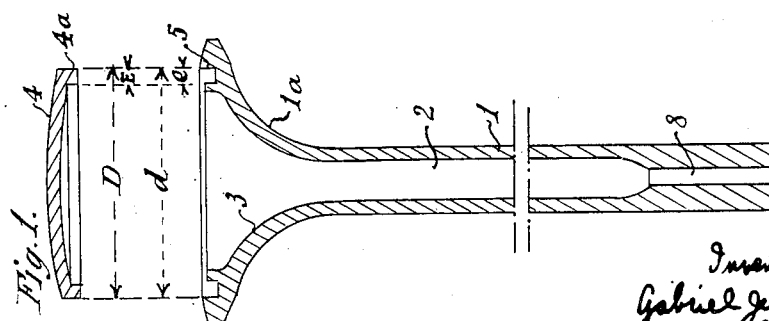
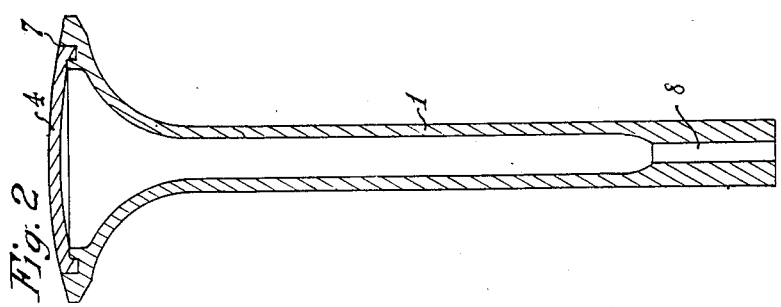
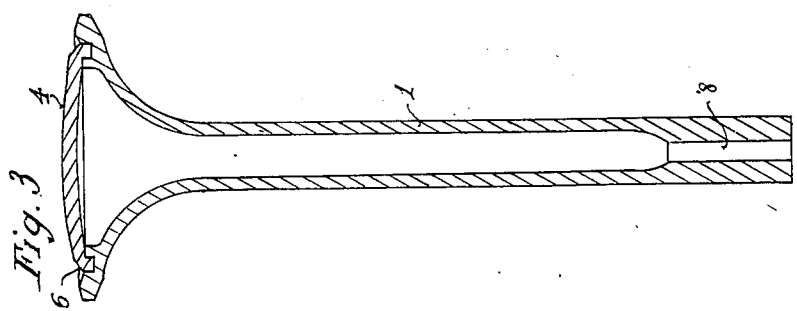
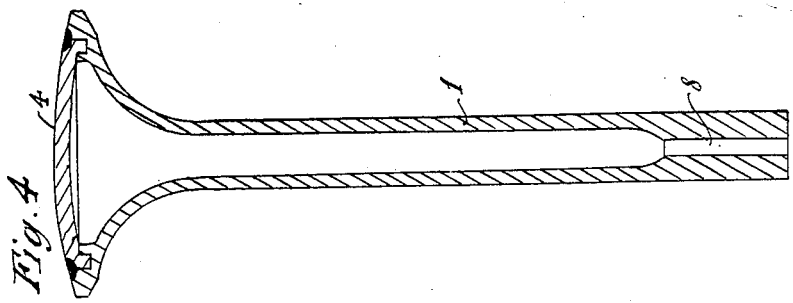

Patented Apr. 28, 1953

2,636,255

UNITED STATES PATENT OFFICE 2,636,255

PROCESS FOR THE PRODUCTION OF HOLLOW VALVES

Gabriel Jeudi dit Jeudy, Paris, France

Application January 22, 1951, Serial No. 207,138
In France January 28, 1950

1 Claim. (Cl. 29—156.7)

It is known to employ, for the purpose of reducing the temperature of valve heads in internal combustion engines, hollow valves containing sodium, the very good conductivity of which causes the heat accumulating in the head to be transmitted to the stem, so that this heat can be dissipated through the valve guide.

Various methods have already been proposed for constructing such hollow valves, but these methods are not entirely satisfactory and considerable rejects are produced thereby.

In the process according to this invention, the head of the valve is closed by a cap provided with a machined flange which fits into a centering groove which is also machined in the head.

The machining of the flange and of the groove is such that the two parts of the valve must be assembled by means of a press. The strength of the assembly is supplemented by a welding bead formed externally along the junction line between these two parts. Thus, in the welding, the cap is maintained perfectly on the body and during operation the tight fit of the cap on the body, together with the said bead, adds to the rigidity of the unit.

In order to prevent the force applied by the press from causing deformation of the cap or of the valve head, the groove necessary for positioning the bead of welding material along the junction line is preferably machined after the assembly in the press.

The description which follows with reference to the accompanying drawings, which are given by way of example, will enable the manner in which the invention can be carried into effect to be readily understood.

In these drawings, Figure 1 shows in longitudinal section a valve and the cap thereof before assembly in the press.

Figure 2 shows, under the same conditions, these two parts after the operation of the press.

Figure 3 shows under the same conditions the same valve after machining of the groove for the formation of the welding bead.

Finally, Figure 4 shows the finished valve, the welding having been completed and the assembly having been machined to the final dimensions.

The valve body 1 shown in these figures is preferably formed from a cylindrical rod by a first swaging operation which expands the head 1a.

The axial bore 2 is then drilled in the solid valve body thus obtained, and the recess 3 is machined.

It will be noted that the latter machining operation is facilitated by the wide flare of this recess, which enables the formation of valve walls of very accurately predetermined thickness.

In addition, a cap 4 having a flange 4a is formed by pressing. A central circular groove 5 is machined in the valve body to receive the flange 4a.

The external diameter D to which the cap is machined is made slightly greater than the maximum diameter $d$ of the groove 5. Similarly, the thickness E of the flange 4a is made slightly greater than the width $e$ of the groove. In order to facilitate assembly the edges of the flange 4a are slightly bent over.

Thus, in order to position the cap on the valve body, it is necessary to employ a press, the form of the valve thus obtained being shown in Figure 2.

A welding groove 6 (see Figure 3) is then turned on a lathe on the upper face of the head of the valve, the said welding groove overlapping the junction line 7 between the cap and the body of the valve. This groove could equally well be formed after the assembly, while, for example, a bevel previously machined on the edge of the cap would reduce the resistance of the flange 4a during assembly in the press.

Since the cap is maintained perfectly in position, a welding bead can be effectively provided in the groove 6. When this bead has been applied, the valve may be brought to its final external dimensions, and the longitudinal section thereof is then as shown in Figure 4.

In order that this valve may be filled with sodium, the bore 2 may be extended by a narrow bore 8 leading to the end of the valve stem. Alternatively, this bore 8 may be omitted and the sodium may be introduced into the valve before the cap 4 is positioned.

What I claim is:

The herein described process for manufacturing a hollow valve having a head forming a chamber adapted to be closed by a fitted cap, comprising the steps of providing said cap with an annular peripheral flange; machining an assembling annular groove in the upper face of the head inwardly of its outer edge, the outer diameter of said groove being slightly smaller than the outer diameter of the flange of said cap and the width of said groove being slightly smaller than the thickness of said flange; force fitting the flange of the cap into the groove so that the outer face of the cap is flush with the upper face of the outer edge portion of the head, whereby the contacting surfaces of said flange and bounding walls of the groove are elastically pressed against each other; machining a further groove in the outer face of the cap and the upper face of the head above the outer bounding wall of the groove and at the point of juncture of the cap and head to form a space for a welding bead; and welding said cap to said head along said further groove for fluid-tight jointing of said cap and said valve head.

GABRIEL JEUDI DIT JEUDY.

References Cited in the file of this patent
UNITED STATES PATENTS

| Number | Name | Date |
|---|---|---|
| 1,649,409 | Jardine | Nov. 15, 1927 |
| 1,805,255 | Osterholm | May 12, 1931 |
| 2,410,190 | Townhill | Oct. 29, 1946 |
| 2,395,942 | Saffady | Mar. 5, 1946 |
| 2,439,240 | Cummings | Apr. 6, 1948 |